United States Patent [19]

Gergen et al.

[11] Patent Number: 5,303,355

[45] Date of Patent: Apr. 12, 1994

[54] PIPELINED DATA PROCESSOR WHICH CONDITIONALLY EXECUTES A PREDETERMINED LOOPING INSTRUCTION IN HARDWARE

[75] Inventors: Joseph P. Gergen; Kin K. Chau-Lee, both of Austin, Tex.

[73] Assignee: Motorola, Inc., Schaumburg, Ill.

[21] Appl. No.: 675,834

[22] Filed: Mar. 27, 1991

[51] Int. Cl.5 .......................... G06F 9/00; G06F 9/40
[52] U.S. Cl. ................................ 395/375; 364/262; 364/262.4; 364/DIG. 1
[58] Field of Search ................................ 395/375, 775

[56] References Cited

U.S. PATENT DOCUMENTS

| | | | |
|---|---|---|---|
| 4,652,997 | 3/1987 | Kolker | 395/375 |
| 4,727,483 | 2/1988 | Saxe | 395/375 |
| 4,882,701 | 11/1989 | Ishii | 395/375 |
| 5,051,896 | 9/1991 | Lee et al. | 395/375 |
| 5,101,484 | 3/1992 | Kohn | 395/375 |

OTHER PUBLICATIONS

Motorola DSP56116 Digital Signal Processor User's Manual, Oct. 1990, pp. A-50, A-51, A-80-A-89, A-178-A-183.
Proceedings ICASSP 90, 1990 International Conference On Acoustics, Speech, and Signal Processing, Apr. 3-6, 1990, IEEE Signal Processing Society.
Nov. 5, 1990 Press Release Statements from Motorola, Inc., Spectrum Signal Processing, Inc., Ariel Corporation, and Mentor Graphics.

Primary Examiner—Parshotam S. Lall
Assistant Examiner—Ayni Mohamed
Attorney, Agent, or Firm—Paul J. Polansky; James L. Clingan, Jr.

[57] ABSTRACT

A data processor (10) having an instruction fetch unit (12), a decode and control unit (14), and an execution unit 16 performs conditionally executed instructions in hardware. A conditional break instruction, BRKcc, is inserted within a looping instruction to conditionally terminate the looping instruction with a minimum number of instruction cycles. A conditional do-loop instruction, DO#0, prevents the data processor (10) from executing a do-loop with a loop count within a loop counter (24) of zero upon entry. A conditional repeat instruction, REP#0, prevents a repeat instruction from being executed if a loop count is zero upon entry. A conditional repeat instruction, REPcc, allows a subsequent instruction to be conditionally terminated during execution.

16 Claims, 5 Drawing Sheets

PIPELINED DATA PROCESSOR WHICH CONDITIONALLY EXECUTES A PREDETERMINED LOOPING INSTRUCTION IN HARDWARE

FIELD OF THE INVENTION

This invention relates generally to data processor instructions, and more particularly, to data processor instructions which are executed in hardware.

BACKGROUND OF THE INVENTION

A specific data processing application is often implemented by a data processor with dedicated internal hardware that executes particular instructions within a minimum number of instruction cycles. One such specific data processing application is in the field of Digital Signal Processing (DSP). Commonly utilized instructions in the field of DSP include, but are not limited to, a loop instruction and a conditional branch instruction. A common loop instruction is a do-loop instruction. For example, a do-loop instruction which is implemented in hardware is taught by Linde in U.S. Pat. No. 4,462,074 entitled "Do Loop Circuit." When executed, the do-loop instruction repeatedly executes predetermined instructions a predetermined number of times. Since a looping instruction is a commonly utilized instruction in a DSP application, it is advantageous for a data processor utilized for DSP applications to process a do-loop in a minimum number of instruction cycles. After a data processor begins executing a do loop, a conditional branch instruction is commonly used for the purpose of exiting the looping prior to full completion. A conditional branch instruction is a commonly utilized DSP instruction. It also is desired to minimize the necessary instruction cycles for executing a conditional branch instruction. When a conditional branch is executed within a do loop, additional instruction cycles are typically required for instruction completion. Instructions for implementing DSP functions are typically not compiled, wherein "compiled" refers to calculating function-specific target addresses. Compilers are not typically used in DSP applications in order to save instruction memory space. In summary, a need exists to process commonly utilized DSP instructions, such as a do-loop and a conditional branch instruction, that are not necessarily compiled and within a minimum number of instruction cycles.

SUMMARY OF THE INVENTION

The previously mentioned needs are fulfilled with the present invention. In one form, a pipelined data processor conditionally executes a predetermined looping instruction in hardware. A status register receives and stores a plurality of condition codes of the pipelined data processor in response to status modifying instructions. An instruction fetch means selectively fetches a first instruction which is one of the status modifying instructions during a looping operation, and fetches a second instruction. The first instruction selectively activates at least one of the plurality of condition codes. The instruction fetch means has a control input for receiving a control signal for modifying a predetermined order of instruction execution. An instruction decode means decodes instructions executed by the pipelined data processor and provides decoded control signals in response thereto. The instruction decode means selectively provides the control signal and controls termination of the predetermined looping instruction by providing a termination control signal to the instruction fetch means which modifies a order of instruction fetching in response to an activation of a predetermined one of the plurality of condition codes. An instruction execution means receives the decoded control signals, and executes general data processing instructions. The pipelined data processor selectively executes the second instruction in response to the activation of the predetermined one of the plurality of condition codes as selectively activated by the first instruction.

These and other features, and advantages, will be more clearly understood from the following detailed description taken in conjunction with the accompanying drawings.

DESCRIPTION OF A PREFERRED EMBODIMENT

Figure 1:
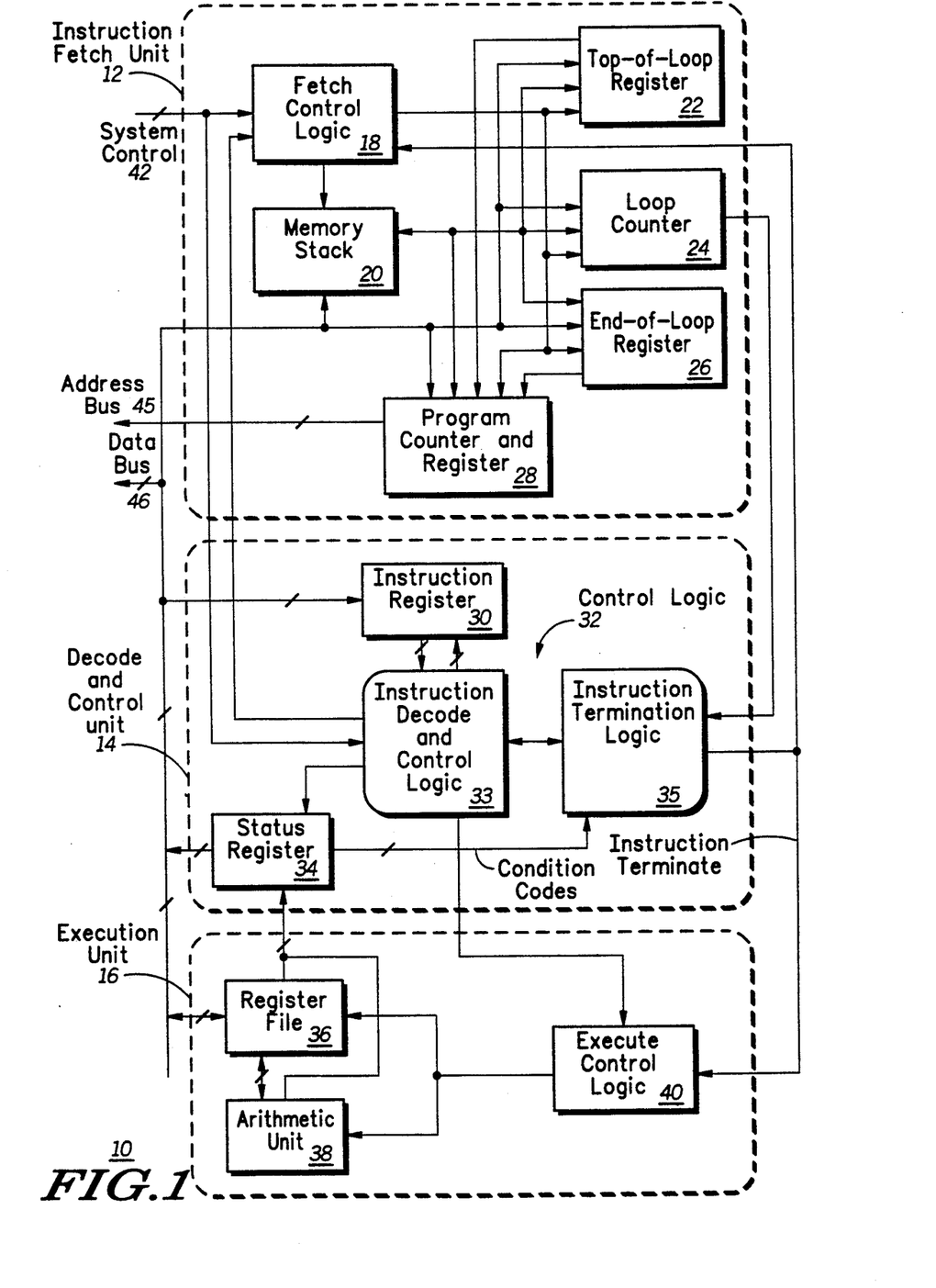
FIG. 1 illustrates in block diagram form a data processing system in accordance with the present invention.

Illustrated in FIG. 1 is a block diagram of a data processor 10 which includes hardware for conditionally implementing looping instructions in accordance with the present invention. Data processor 10 has an instruction fetch unit 12, a decode and control unit 14 and an execution unit 16. The fetch unit 12 has a fetch control logic 18, a memory stack 20, a top-of-loop register 22, a loop counter 24, and end-of-loop address register 26 and a program counter and register 28. Decode and control unit 14 has an instruction register 30, a control logic 32, and a status register 34. Control logic 32 has an instruction decode and control logic 33 and an instruction termination logic 35. Execution unit 16 has a register file 36, an arithmetic unit 38 and an execute control logic 40.

Fetch control logic unit 18 has a first control input labeled "system control 42" to receive control information from an external source (not illustrated), a second control input to receive additional control information from an output of the instruction decode and control logic 33, and a third control input to receive a control signal labeled "instruction terminate" from an output of the instruction termination logic 35. Fetch control logic 18 has a first control output connected to an input of the memory stack 20, and a second control output connected to an input of each of top-of-loop register 22, loop counter 24 end-of-loop register 26, and program counter and register 28. Memory stack 20 has an input for receiving data from an external source (not illustrated) via a data bus 46. Further, memory stack 20 is connected via a bidirectional data bus (not labeled) to top-of-loop register 22, loop counter 24, end-of-loop register 26, and the program counter and register 28. Top-of-loop register 22 has an output connected to an input of program counter and register 28, and a data input for receiving data from an external source (not illustrated) via data bus 46. Loop counter 24 has an input for receiving data from an external source (not illustrated) via data bus 46, and an output connected to a first input of instruction termination logic 35. End-of-loop register 26 has an output connected to an input of program counter and register 28. Program counter and register 28 has an output for providing addresses to an external source via an address bus 45.

Instruction register 30 has a data input connected to data bus 46, a control input connected to an output of the instruction decode and control logic 33, and an output connected to an input of instruction decode and control logic 33. Instruction decode and control logic 33 has a control input connected to system control 42, a first control output connected to a first control input of status register 34, a second control output connected to a first control input of execute control logic 40, and a control input/output (I/O) connected to a control input/output (I/O) of instruction termination logic 35. Instruction termination logic 35 has a second input connected to an output of status register 34, and a control output connected to a second input of execute control logic 40 labeled "instruction terminate." The status register 34 has an output connected to data bus 46, and inputs connected to both an output of register file 36 and an output of arithmetic unit 38.

Register file 36 has an input/output (I/O) connected to data bus 46, an input/output (I/O) connected to an input/output (I/O) of arithmetic unit 38, and a control input connected to a control output of execute control logic 40 and a control input of arithmetic unit 38.

Figure 2:
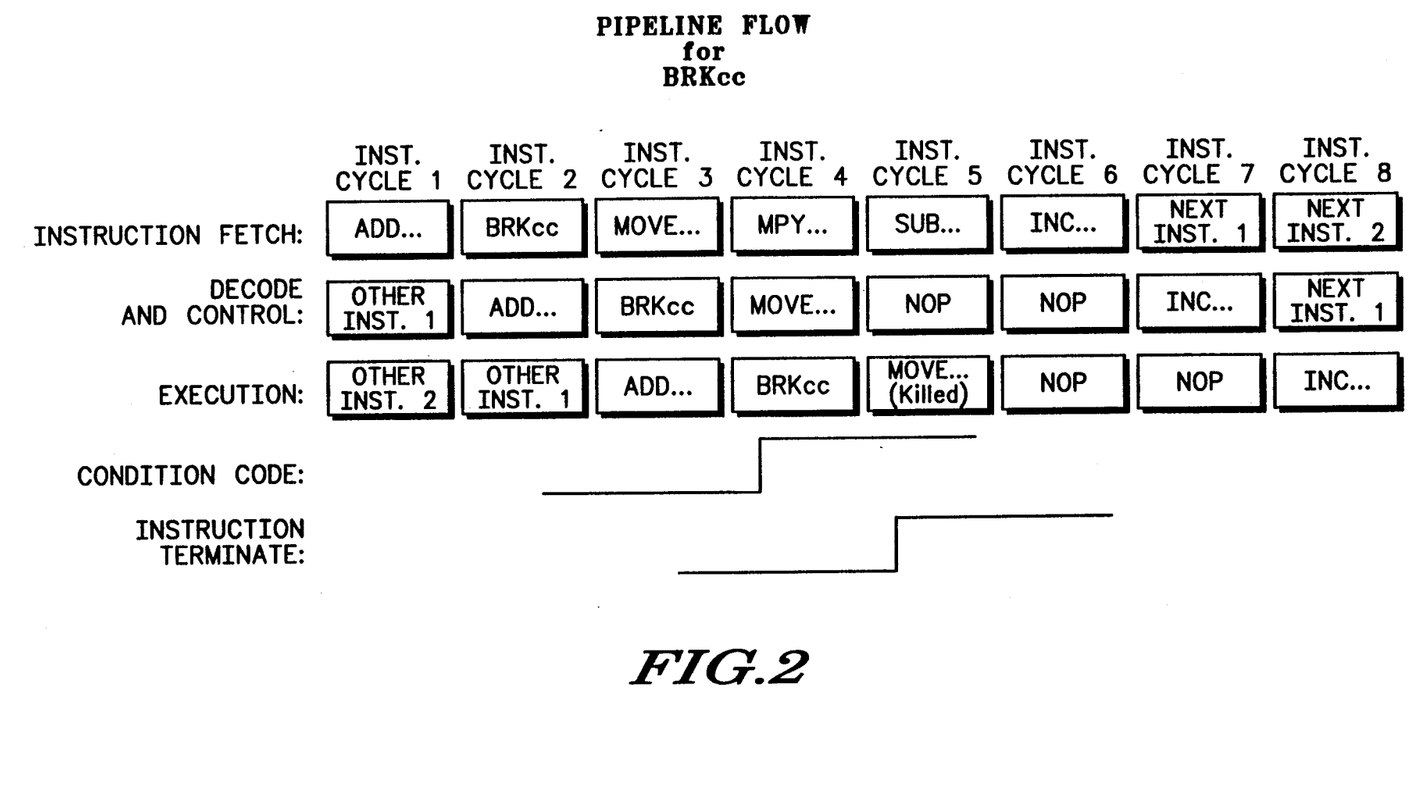
FIG. 2 illustrates in instruction pipeline diagram form an instruction pipeline flow of a first conditionally executed instruction in accordance with the present invention.

Illustrated in FIG. 2 is a pipeline flow diagram for a conditional loop break instruction, BRKcc, where "cc" represents a condition that must be met before the BRKcc instruction will execute. The pipeline flow diagram has an instruction fetch pipe labeled "INSTRUCTION FETCH," a decode and control pipe labeled "DECODE AND CONTROL," an execution pipe labeled "EXECUTION," a condition code timing signal labeled "CONDITION CODE," and an instruction terminate timing signal labeled "INSTRUCTION TERMINATE." As illustrated, each pipe is divided into smaller portions representing a time period required to execute an instruction and is labeled "INST. CYCLE."

The BRKcc instruction is utilized to conditionally exit a looping type instruction, such as a do-loop instruction. When a looping type instruction is executed within another looping type instruction, i.e. nested looping, information pertaining to a first executed looping instruction must be stored in a memory for a second looping instruction. When the second looping instruction is completed, the information pertaining to the first looping instruction is retrieved from memory and stored in predetermined registers. Typical information pertaining to a looping instruction that is stored in a memory before executing the second looping instruction includes, but is not limited to, a top-of-loop register address, a loop counter data, and an end-of-loop register address.

In operation, the BRKcc instruction is inserted within a looping instruction and generally follows an instruction that conditionally modifies a condition code within status register 34. As an example, the following instructions of Table 1 are utilized to illustrate the BRKcc pipeline of FIG. 2 with data processor 10 of FIG. 1:

TABLE 1

| DO#7, Lb1 | ; |
|---|---|
| ADD ... | ; modify condition code |
| BRKcc | ; |
| MOVE ... | ; not executed |
| MPY ... | ; not decoded |
| SUB ... | ; not decoded |
| Lb1 | |
| INC ... | ; instruction executed after BRKcc |

The DO#7, Lb1 instruction is intended to execute instructions following the DO#7, Lb1 instruction, up to Lb1, seven times. The BRKcc instruction within loop monitors predetermined condition codes within status register 34 during each iteration of the DO#7, Lb1 instruction. If a predetermined condition code is activated by an instruction preceding the BRKcc instruction, the BRKcc instruction breaks the DO#7, Lb1 instruction flow and skips to an instruction following the DO#7, Lb1 instruction. When a BRKcc instruction is not conditionally executed, the BRKcc instruction executes for one instruction cycle.

In more detail, top-of-loop register 22 of FIG. 1 contains the address of the first executable instruction after the DO#7, Lb1 instruction. Loop counter 24 contains an integer number representing the number of iterations of the DO#7, Lb1 instruction that remain to be executed, and the end-of-loop register 26 contains a memory address for "Lb1", which is the address of the last instruction of the DO#7, Lb1 looping instruction. In response to second control output from fetch control logic 18, the program counter and register 28 provides an address for fetching the ADD instruction opcode and loads the fetched opcode into instruction register 30. The ADD fetch operation is illustrated in FIG. 2 with the ADD instruction located in a first instruction cycle of the instruction fetch pipe. During a second instruction cycle, a "BRKcc" instruction is fetched and loaded into instruction register 30 and the ADD instruction is decoded within the instruction decode and control logic 33. The decode and control pipe of FIG. 2 illustrates the ADD instruction in a second instruction cycle position. Subsequently, a "MOVE" instruction is fetched and loaded into instruction register 30, the BRKcc instruction is decoded by the instruction decode and control logic 33, and control signals from instruction decode and control logic 33 cause execute control logic 40 to control the processing of the ADD instruction in execution unit 16. For this example, during a fourth instruction fetch cycle a condition code within status register 34 is modified in response to the processing of the ADD instruction. Further, during the fourth instruction fetch cycle instruction fetch unit 12 fetches an "MPY" or multiply instruction, and the MOVE instruction is decoded in instruction decode and control logic 33. In response to the condition code being activated, instruction termination logic 35 selectively activates an instruction terminate signal during a fifth instruction cycle. Also, during the fifth instruction cycle the activated instruction terminate signal causes instruction decode and control logic 33 to force a "NOP" or 'no operation' instruction output to execute control logic 40; execute control logic 40 is forced to terminate the MOVE instruction which was in progress; and the address within end-of-loop register 26 is incremented by program counter and register 28. Because of the activated instruction terminate signal, the opcodes that are fetched during the fourth and fifth instruction cycles are ignored by instruction decode and control logic 33. During the sixth instruction cycle, an increment or "INC" instruction is fetched and loaded into instruction register 30, instruction decode and control logic 33 forces a NOP to execute control logic 40, and execute control logic 40 processes the NOP instruction. During the seventh instruction cycle, the INC instruction is decoded by instruction decode and control logic 33 to be executed during an eighth instruction cycle.

Another use of the BRKcc instruction is to set up a hardware "while" loop. A "while" loop, in this context, refers to a loop which can only be exited when a predetermined condition becomes true. Because the BRKcc instruction can be placed anywhere in a loop, a large amount of flexibility is possible. In one form, a "while" loop may be implemented with the code shown in Table 1 with the exception that the first instruction is modified as follows:

DO Forever, Lbl.

The Do Forever instruction creates a loop which data processor 10 cannot exit based solely on value in the loop counter 24.

To summarize, for the illustrated example, when a BRKcc instruction is conditionally evaluated to be true during a looping instruction, data processor 10 executes an additional three instruction cycles. During two spent instruction cycles, the program counter and register 28 calculates the address of the next instruction. Further, for a nested looping condition fetch control logic 18 restores stacked nested looping instruction information from a previous looping instruction from a memory, such as memory stack 20, to predetermined registers during the two spent instruction cycles.

Figure 3:
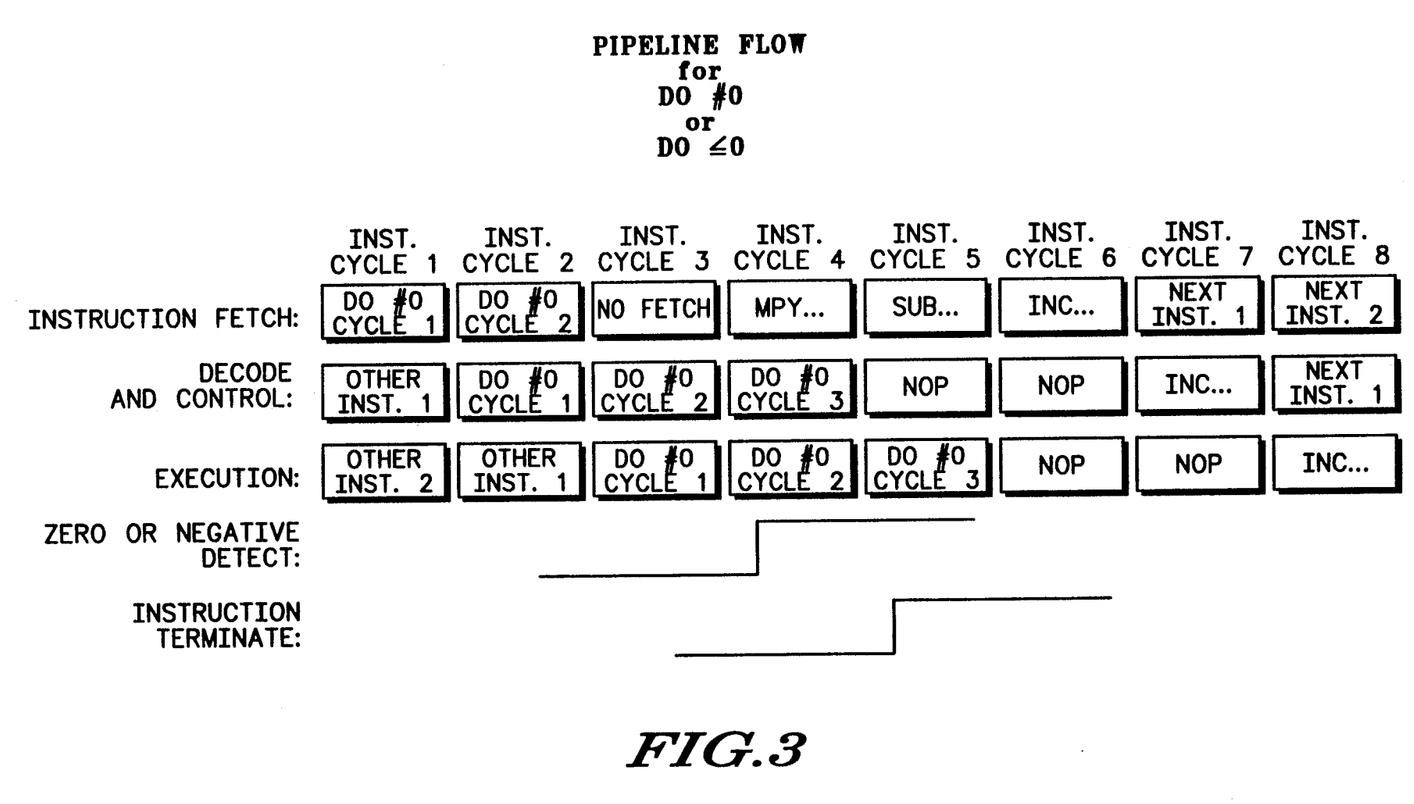
FIG. 3 illustrates in instruction pipeline diagram form an instruction pipeline flow of a second conditionally executed instruction in accordance with the present invention.

Illustrated in FIG. 3 is a pipeline flow for a DO#0 or a DO≦0 instruction. The DO#0 and DO≦0 instructions differ from typical DO-loop instructions in the following manner. A typical DO-loop instruction is processed by executing predetermined instructions within the DO-loop instruction; decrementing a loop counter that contains a loop count for the typical DO-loop instruction; and then checking if the loop count value is a zero before returning to a beginning of the typical DO-loop instruction. However if the loop count is controlled by a variable and the variable is set to zero before the typical DO-loop instruction is executed, the typical DO-loop instruction is executed incorrectly. For example, if the loop counter is a sixteen bit counter, and the value of an iteration variable for a DO-loop instruction is zero, the typical DO-loop instruction will execute for $2^{16}$ iterations instead of zero. The DO#0 instruction prevents an erroneous repetitive execution of a typical DO-loop instruction as discussed above by first checking if the loop count value is a zero before the DO-loop instruction is executed. A similar problem for a DO-loop instruction occurs when the loop count value is a negative number. When the loop count for a typical DO-loop instruction is a negative number, the typical DO-loop instruction executes in an erroneous manner similar to the above discussion. In contrast, the DO≦0 instruction eliminates erroneous execution of a DO-loop instruction when a loop count is negative by examining the loop count for a negative number before execution. As an example, the following instruction sequence of Table 2 is used to illustrate the execution of a DO#0 instruction.

TABLE 2

| MOVE#0, x | ; move zero to variable "x" |
|---|---|
| . | |
| . | |
| . | |
| DO x, Lbl | ; if x=0, skip do-loop (i.e. DO#0) |
| MPY ... | ; not decoded |
| SUB ... | ; not decoded |
| . | |
| . | |
| . | |
| Lbl | |
| INC ... | ; instruction after do-loop |

The MOVE instruction loads a zero into a variable "x." In response to the variable "x" being a zero, the DO x, Lbl instruction becomes a DO#0 instruction. FIG. 3 illustrates a pipeline flow for the above DO#0 instruction. During a first instruction cycle time, the first cycle of the DO#0 instruction is fetched by program counter and register 28 and loaded into instruction register 30, both of FIG. 1. During a second instruction cycle, a first cycle of the DO#0 instruction is decoded by instruction decode and control logic 33, and the second cycle of the DO#0 instruction is fetched and loaded into end-of-loop register 26. During a third instruction cycle control information for the first cycle of the DO#0 is transferred from instruction decode and control logic 33 to execute control logic 40; the second cycle of DO#0 instruction is decoded by the instruction decode and control logic 33; and loop counter 24 is loaded with a loop count. During a fourth instruction cycle, control information for the second cycle of the DO#0 instruction is transferred from instruction decode and control logic 33 to execute control logic 40; instruction termination logic 35 receives the loop count data from loop counter 24 and detects a loop count value of zero; and an MPY instruction is fetched and loaded into instruction register 30. During a fifth instruction cycle the instruction termination logic 35 activates the instruction terminate signal; the activated instruction terminate signal blocks completion of the DO#0 instruction in execution unit 16. Instruction termination logic 35 also forces a first NOP instruction to be loaded into instruction register 30; the address within the end-of-loop register 26 is incremented by program counter and register 28; and a SUB instruction is fetched and loaded into instruction register 30. During a sixth instruction cycle execution unit 16 executes the first NOP; instruction decode and control logic 33 forces a second NOP instruction to be loaded into instruction register 30; and an INC instruction is fetched and loaded into the instruction register 30. During a seventh instruction cycle the second NOP instruction is executed within execution unit 16; the INC instruction is decoded by instruction decode and control logic 33; and the next instruction is fetched and loaded into instruction register 30. During an eighth instruction cycle, the INC instruction is executed within execution unit 16 and a normal flow of fetching and executing instructions continues. To summarize, the DO#0 and DO≦0 instructions eliminate erroneous execution of a DO loop instruction with hardware within data processor 10. The hardware within data processor 10 verifies that a predetermined loop count condition is valid before executing the DO loop instruction. By conditionally executing a DO loop instruction, erroneous results are avoided and instruction cycles are conserved.

Figure 4:
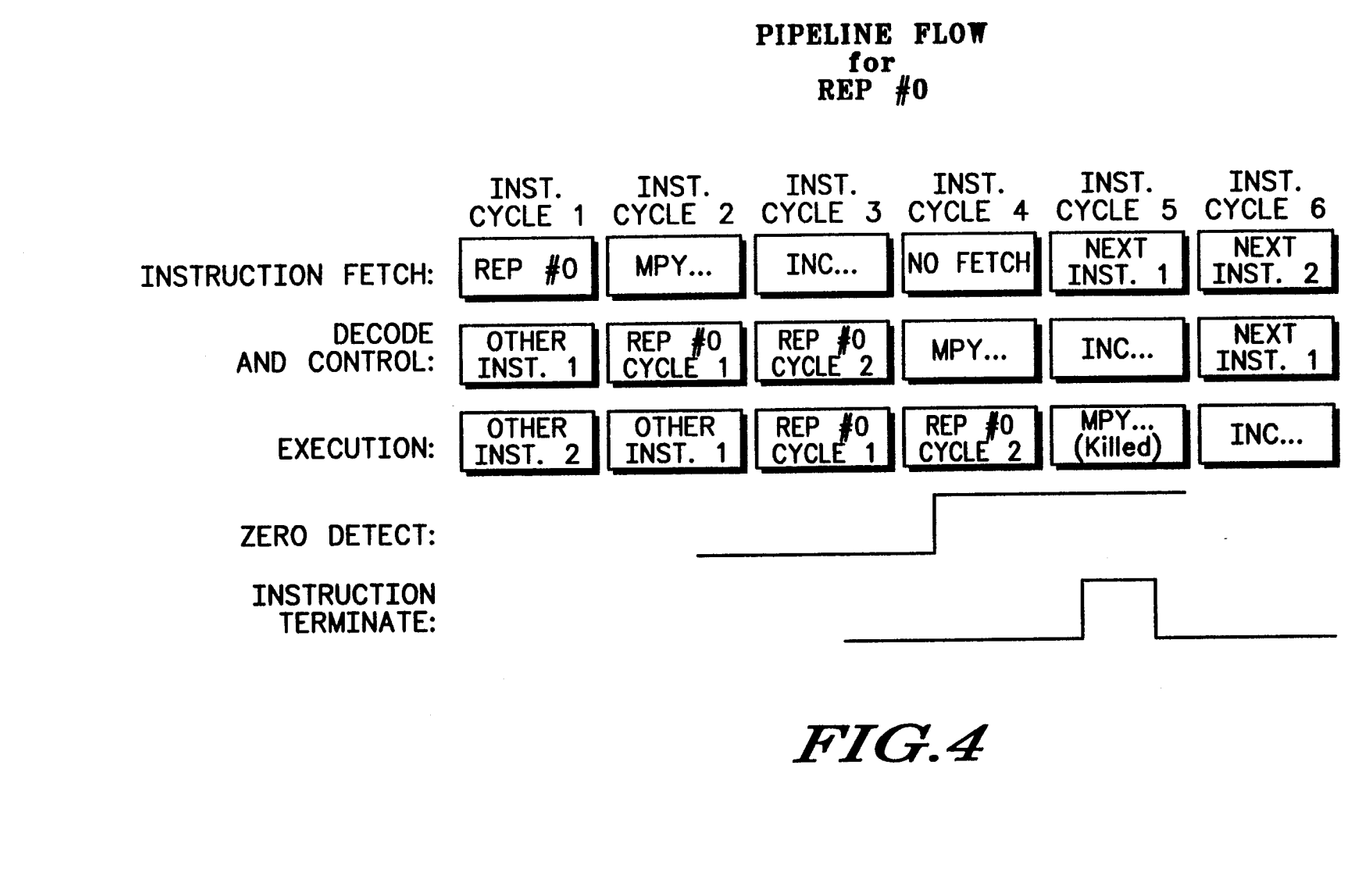
FIG. 4 illustrates in instruction pipeline diagram form an instruction pipeline flow of a third conditionally executed instruction in accordance with the present invention.

Another type of repeating instruction that is similar to a DO-loop instruction is a repetitive instruction, REP. The REP instruction repeatedly executes an instruction immediately following the REP instruction a predetermined number of times. For example a REP#7 followed by an MPY causes the MPY instruction to be repeatedly executed seven times. A typical REP instruction operates similarly to the typical DO-loop instruction in that a loop count associated with each instruction is decremented after each iteration. A problem with a typical REP instruction is that if the loop count value is a zero before execution begins, the REP instruction is erroneously executed as describe above for the typical DO-loop instruction. To eliminate the problem of erroneously executing a typical REP instruction, a REP#0 instruction is created. The REP#0 operates similarly to the DO#0 instruction in that a loop count value for the REP#0 instruction is checked for a non-zero value before executing. The following instruction sequence of Table 3 illustrates the REP#0 instruction, and FIG. 4 illustrates a pipeline flow for the REP#0 instruction sequence.

TABLE 3

| MOVE#0, x | ; put zero in register "x" |
|---|---|
| . | |
| . | |
| . | |
| REP#x | ; if x=0, skip rep instruction |
| MPY . . . | ; not executed if x=0 |
| INC . . . | ; a next instruction |

Since the MOVE#0, x instruction puts a zero into register "x," the REPx instruction becomes a REP#0 instruction and the instruction following the REP instruction is not executed. A first instruction cycle of the pipeline flow for REP#0 in FIG. 4 illustrates that the REP#0 instruction is fetched and loaded into instruction register 30 of data processor 10. During a second instruction cycle REP#0 instruction is decoded by the instruction decode and control logic 33, and an MPY is fetched and loaded into a temporary register (not illustrated). During a third instruction cycle a first portion, labeled cycle 1, of REP#0 instruction is executed in the execution unit 16; a second portion of the REP#0 instruction, labeled cycle 2, is decoded by instruction decode and control logic 33; the MPY instruction is transferred from the temporary register (not illustrated) to instruction register 30; and an INC instruction is fetched and loaded into the temporary register (not illustrated). During a fourth instruction cycle loop count register 24 is loaded with a loop count value associated with REP#0 instruction, which has a value of zero, and the instruction termination logic 35 detects that the value within loop counter 24 is a zero; the MPY instruction is transferred from the temporary holding register (not illustrated) to instruction decode and control logic 33 to be decoded; and instruction fetch unit 12 is prevented from fetching a next instruction. During a fifth instruction cycle the instruction termination logic 35 activates the instruction terminate signal which kills the MPY instruction in progress; the INC instruction is decoded by instruction decode and control logic 33; and a next instruction is fetched and loaded into instruction register 30. During a sixth instruction cycle the INC instruction is executing in execution unit 16, and a normal flow of instruction fetching and execution continues.

To summarize, hardware within data processor 10 examines loop counter 24 to detect a loop count of non-zero for a REP#0 instruction to avoid erroneously executing an instruction following the REP#0 instruction. By detecting a loop count of zero before executing the instruction following the REP instruction, erroneous results are avoided and instruction cycles are conserved.

Figure 5:
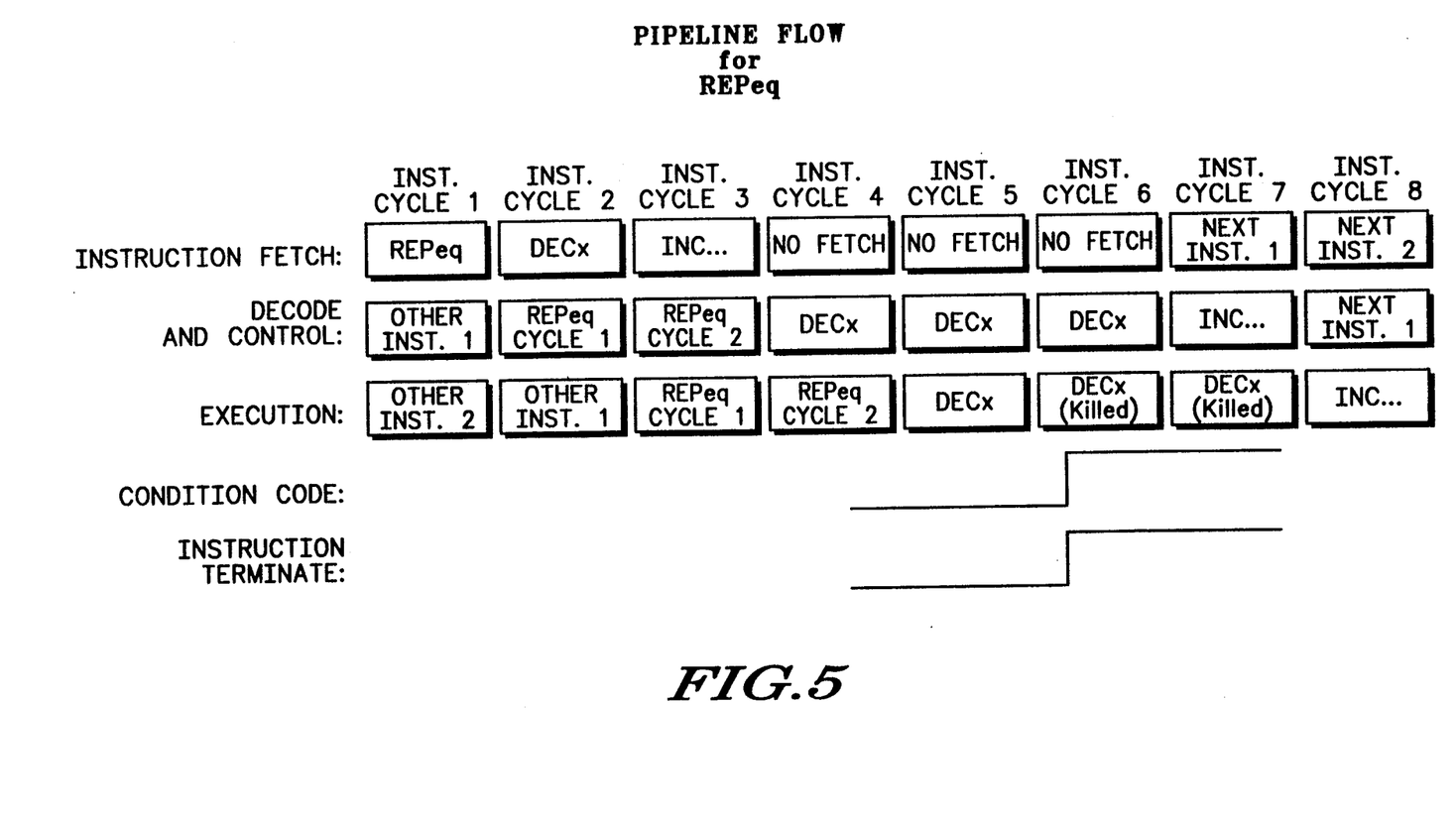
FIG. 5 illustrates in instruction pipeline diagram form an instruction pipeline flow of a fourth conditionally executed instruction in accordance with the present invention.

A variation of each of the REP#0 and the BRKcc instructions is a conditional repeat instruction, REPcc. The REPcc instruction is similar to the REP#0 instruction in that only the instruction immediately following the REPcc instruction is conditionally executed. The REPcc instruction is similar to the BRKcc instruction in that the REPcc instruction conditionally terminates in response to a condition code within a status register being modified. the following instruction sequence of Table 4 along with FIG. 1 and FIG. 5 illustrate a REPeq instruction.

TABLE 4

| MOVE#1, x | ; move one to register "x" |
|---|---|
| . | |
| . | |
| . | |
| TSTx | ; check if "x" is zero |
| REPeq | ; repeat until "cc" is true |
| DECx | ; decrement register "x" |
| INC . . . | ; a next instruction |

For the above example, the REPeq instruction is conditionally executed if a predetermined condition code bit within status register 34 is not activated. The instruction sequence begins with a MOVE instruction loading a value of one into register "x" which is one of the registers in register file 36. A test instruction, "TSTx", then checks if the value in register "x" is a zero and sets a condition code accordingly. A conditional repeat instruction, REPeq, checks if a predetermined condition code within status register 34 is activated in response to the TSTx instruction. Since the value of register "x" is a one, the REPeq instruction allows the DECx instruction to execute, which decrements the value of one within register "x." The register "x" now contains a zero which causes the predetermined condition code bit within status register 34 to be activated. Since the REPeq instruction checks the predetermined condition code bit before executing the instruction following the REPeq instruction, and since the predetermined condition code bit is activated, the DECx instruction is prevented from executing again.

FIG. 5 illustrates a pipeline instruction flow for the REPeq instruction. During a first instruction cycle 5 the REPeq instruction is fetched and loaded into instruction register 30 of data processor 10. During a second instruction cycle the REPeq instruction is decoded by instruction decode and control logic 33, and a DECx instruction is fetched and loaded into a temporary register (not illustrated). During a third instruction cycle a first portion, labeled cycle 1, of the REPeq instruction is executed within execution unit 16; the DECx instruction is loaded into instruction register 30; a second portion of the REPeq instruction, labeled cycle 2, is decoded by instruction decode and control logic 33; and an INC instruction is fetched and loaded into a temporary register (not illustrated). During a fourth instruction cycle the second portion of the REPeq instruction is executed within execution unit 16; the DECx instruction is decoded in instruction decode and control logic 33; and instruction fetch unit 12 is prevented from fetching the next instruction. During a fifth instruction cycle the DECx instruction is executed within execution unit 16 causing the value within register "x" to be decremented to zero; DECx instruction remains within the instruction decode and control logic 33; and instruction fetch unit 12 is prevented from fetching a next instruction. During a sixth instruction cycle the predetermined condition code with status register 34 is activated in response to the value within register "x" being a zero, and the INC instruction that resides within the temporary register (not illustrated) is transferred to instruction register 30. In response to the activated predetermined condition code, instruction termination logic 35 activates the instruction terminate signal. The activated instruction terminate signal causes the executing DECx instruction within execution unit 16 to be killed. Further, during the sixth instruction cycle, the DECx instruction remains within decode and control logic 33, and instruction fetch unit 12 is prevented from fetching the next instruction. During a seventh instruction cycle the DECx instruction that was being decoded within instruction decode and control logic 33 during the sixth instruction cycle is killed; the INC instruction is decoded by decode and control logic 33; and instruction fetch unit 12 fetches a next instruction. During an eighth instruction cycle the INC instruction is executing within execution unit 16 and a normal execution flow for data processor 10 continues.

To summarize, a conditional repeat instruction REPcc, such as a REPeq instruction, repeatedly executes a subsequent instruction while a predetermined condition within status register 34 is not activated. In response to the predetermined condition code within status register 34 becoming active, the REPcc instruction is terminated.

By now it should be apparent that there has been provided a data processor 10 having an instruction fetch unit 12, a decode and control unit 14, and an execution unit 16 which allows a conditionally executed instruction to be implemented in hardware. The present invention provides a set of optimized software instructions which are extremely efficient in improving data processing execution speed and reducing resident program memory size. By being able to conditionally exit a looping operation anywhere in a loop when needed or required, data processing efficiency is maximized.

Further, the optimized software instructions ensure proper data processing operation when performing looping functions. In particular, errors associated with a loop count of zero in a loop counter when entering a loop are avoided by the present invention.

In one form of the present invention, a conditional break instruction, the BRKcc instruction, is used in conjunction with a looping instruction which allows the looping instruction to be efficiently terminated. When the BRKcc instruction is terminated, nested looping values associated with a previous looping instruction are restored to appropriate registers. A DO#0 looping instruction prevents a do-loop instruction from being erroneously executed if a loop count value associated with the do-loop instruction is a zero. A REP#0 looping instruction is similar to the DO#0 looping instruction in that the REP#0 looping instruction prevents a subsequent instruction from being erroneously executed when a loop count value for the REP#0 instruction is a zero upon loop entry.

In another form of the present invention, a REPcc instruction is provided which is similar to the BRKcc instruction. The REPcc instruction conditionally terminates a subsequent instruction in response to a predetermined activated condition code within a status register. In contrast, the BRKcc instruction is conditionally executed in response to an activated condition code bit within the status register.

Although specific conditions are discussed for conditionally executed instruction implemented in hardware, various other conditions may be implemented. For example, the DO#0 and REP#0 instructions may be implemented to check for loop counter boundary values other than zero before execution. Such loop counter boundary values may include, but are not limited to, a less than, a less than or equal, a greater than, a greater than or equal, as well as finite positive and negative integer boundary values.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A pipelined data processor which conditionally executes a predetermined looping instruction in hardware, comprising:

a status register for receiving and storing a plurality of condition codes of the pipelined data processor in response to status modifying instructions;

instruction fetch means for selectively fetching a first instruction which is one of the status modifying instructions during a looping operation and fetching a second instruction, the first instruction selectively activating at least one of the plurality of condition codes, the instruction fetch means having a control input for receiving a control signal for modifying a predetermined order of instruction execution;

an instruction decode means for decoding instructions executed by the pipelined data processor and providing decoded control signals in response thereto, the instruction decode means selectively providing the control signal and controlling termination of the predetermined looping instruction by providing a termination control signal to the instruction fetch means which modifies an order of instruction fetching, in response to an activation of a predetermined one of the plurality of condition codes; and an instruction execution means for receiving the decoded control signals and executing general data processing instructions;

whereby the pipelined data processor selectively executes the second instruction in response to the activation of the predetermined one of the plurality of condition codes as selectively activated by the first instruction.

2. The pipelined data processor of claim 1 wherein the second instruction is a conditional branch instruction.

3. The pipelined data processor of claim 1 wherein the instruction fetch means fetches the second instruction immediately subsequent to fetching the first instruction.

4. The pipelined data processor of claim 1 wherein the instruction decode means controls termination of the predetermined looping instruction by providing a termination control signal to the instruction execution means which stops execution of the instruction in response to the termination control signal.

5. The pipelined data processor of claim 1 wherein the instruction decode means controls termination of the predetermined looping instruction by modifying an order in which the instruction decode means decodes data processing instructions.

6. A pipelined data processor which conditionally executes a predetermined looping instruction in hardware, comprising:
 a register for receiving and storing a count value corresponding to a number of executable loops associated with the predetermined looping instruction;
 instruction fetch means for selectively fetching the predetermined looping instruction, the predetermined looping instruction selectively modifying a count within the register when executed, the instruction fetch means having a control input for receiving a fetch inhibit signal;
 control means coupled to the register, for receiving the count value and for verifying the count value being within a predetermined value range, the control means also decoding the predetermined looping instruction and providing decoded control signals in response thereto, the control means detecting a looping instruction which is conditionally executable and breaking a normal flow of instruction execution in response thereto, the control means controlling termination of the predetermined looping instruction by modifying an order in which the control means decodes data processing instructions in response to both the count value being outside of the predetermined value range and detecting the predetermined looping instruction being conditionally executable; and
 an instruction execution means coupled to the control means, for receiving the decoded control signals, and for executing the predetermined looping instruction until an instruction terminate control signal is activated.

7. The pipelined data processor of claim 6 wherein the predetermined looping instruction is a conditionally executable nested do loop instruction.

8. The pipelined data processor of claim 6 wherein the control means controls termination of the predetermined looping instruction by providing a termination control signal, and wherein the instruction execution means stops execution of the instruction in response to the termination control signal.

9. The pipelined data processor of claim 6 wherein the control means controls termination of the predetermined looping instruction by providing a termination control signal to the instruction fetch means, the instruction fetch means modifying an order of instruction fetching in response to the termination control signal.

10. A method of conditionally executing a predetermined looping instruction in hardware in a pipelined data processor, comprising the steps of:
 receiving and storing a plurality of condition codes in a status register of the pipelined data processor in response to at least one status modifying instruction;
 selectively fetching a first instruction which is one of the status modifying instructions during a looping operation and fetching a second instruction, the first instruction selectively activating at least one of the plurality of condition codes;
 selectively modifying a predetermined order of instruction execution in response to a control signal;
 decoding instructions executed by the pipelined data processor and providing decoded control signals in response thereto;
 controlling termination of the predetermined looping instruction by modifying an order in which data processing instructions are decoded in response to an activation of a predetermined one of the plurality of condition codes;
 receiving the decoded control signals and selectively executing the second instruction in response to the activation of the predetermined one of the plurality of condition codes as selectively modified by the first instruction; and
 selectively modifying an order of the decoding of instructions and selectively providing the control signal to modify the order of instruction execution.

11. The method of claim 10 wherein the step of fetching the second instruction further comprises the steps of: fetching a conditional branch instruction; and modifying the order of instruction execution.

12. The method of claim 11 wherein the step of fetching the conditional branch instruction further comprises: the step of providing a conditional branch instruction address defining a subsequent instruction.

13. The method of claim 10 wherein the step of fetching the second instruction further comprises the step of fetching the second instruction immediately subsequent to fetching the first instruction.

14. The method of claim 10 wherein the step of controlling termination of the predetermined looping instruction further comprises the steps of:
 providing a termination control signal; and
 stopping execution of the predetermined looping instruction in response to the termination control signal.

15. The method of claim 10 wherein the step of controlling termination of the predetermined looping instruction further comprises the steps of:
 providing a termination control signal; and
 modifying an order of instruction fetching in response to the termination control signal.

16. A pipelined data processor which conditionally executes a predetermined looping instruction in hardware, comprising:
 instruction fetch means for sequentially fetching a plurality of instructions including the predetermined looping instruction and a status modifying instruction via a data path, and for providing the plurality of instructions fetched thereby to an output thereof;

decode means coupled to the output of the instruction fetch means, for receiving the plurality of instructions, for providing a corresponding plurality of decoded signals in response thereto, and for storing a plurality of condition codes; and an execution unit coupled to the decode means, for performing a plurality of operations corresponding to the plurality of instructions as determined by the plurality of decoded control signals, and for activating a predetermined one of the plurality of condition codes selectively in response to one of the plurality of operations corresponding to the status modifying instruction;

the decode means further terminating an execution of the predetermined looping instruction in response to an activation of the predetermined one of the plurality of condition codes;

the instruction fetch means further modifying an order of instruction fetching in response to the activation of the predetermined one of the plurality of condition codes;

the decode means comprising:

an instruction decoder coupled to the instruction fetch means and to the execution unit, for receiving and decoding the instructions provided by the instruction fetch means and for providing the corresponding plurality of decoded signals to the decode means in response thereto;

a status register coupled to the instruction decoder and to the execution unit, for receiving and storing the plurality of condition codes; and instruction termination means coupled to the instruction decoder and to the status register, for providing an instruction terminate signal to the instruction decoder in response to an activation of the predetermined one of the plurality of condition codes.

* * * * *